United States Patent [19]

Komuro et al.

[11] 4,345,255
[45] Aug. 17, 1982

[54] ANTENNA FEED SYSTEM

[75] Inventors: Keigo Komuro; Matsuichi Yamada, both of Tokyo; Katsuhiko Aoki, Amagasaki; Yoshihiko Yoshikawa, Amagasaki; Fumio Itoh, Amagasaki; Fumio Takeda; Osami Ishida, both of Kamakura, all of Japan

[73] Assignees: Kokusai Denshin Denwa Co., Ltd.; Mitsubishi Denki Kabushiki Kaisha, both of Tokyo, Japan

[21] Appl. No.: 105,741

[22] Filed: Dec. 19, 1979

[30] Foreign Application Priority Data

Dec. 25, 1978 [JP] Japan .................................. 53-160607
Mar. 2, 1979 [JP] Japan .................................. 54-24743

[51] Int. Cl.³ .............................................. H04B 7/00
[52] U.S. Cl. .................................. 343/100 PE; 455/63
[58] Field of Search ................... 343/100 PE; 455/60, 455/63

[56] References Cited

U.S. PATENT DOCUMENTS 3,735,266 5/1973 Amitay .
4,090,137 5/1978 Soma et al. .......................... 455/63

Primary Examiner—Theodore M. Blum
Attorney, Agent, or Firm—Wenderoth, Lind & Ponack

[57] ABSTRACT

Each of a transmitter and a receiver connected to an antenna through a duplexer includes a $\pi/2$ and a $\pi$ polarizer and an ortho-mode transducer (OMT) serially interconnected. In the receiver the OMT is connected at one output to a branching circuit and at the other output to a coupler which is connected to the branching circuit through a transfer circuit. In the transmitter, the OMT is connected at one input to a branching circuit and at the other input to a coupler subsequently connected to the branching circuit through a transfer circuit.

8 Claims, 7 Drawing Figures

ANTENNA FEED SYSTEM

BACKGROUND OF THE INVENTION

This invention relates to an antenna feed system for communication techniques utilizing dual orthogonal polarization, for example, a horizontally and a vertically polarized wave for linear polarization or a righthand and a lefthand, circularly polarized wave for circular polarization, and more particularly to an antenna feed system for compensating for a cross polarization due to the depolarization effect of the propagation passageway therefor.

There are well known frequency reuse systems employing two orthogonally polarized waves of the same frequency spectrum carrying different information thereby. Such frequency reutilizing systems are introduced into satellite communication systems and others. In those systems it is essential to sufficiently compensate for the cross polarization due to the depolarization effect of propagation passageways. To this end, there have been previously proposed various approaches, one of which is disclosed in Japanese laid-open patent application No. 115,717/1976 entitled "Cross Polarization Compensating System". The disclosed system comprises a simultaneously operated transmitting and receiving antenna and a transmitter unit and a receiver unit connected to the antenna through a duplexer. In the receiver unit, an ortho-mode transducer resolves a pair of received elliptically polarized oppositely rotated waves into a pair of orthogonal components after the elliptically polarized waves have be transformed so as to have respective major axes orthogonal to each other. Those orthogonal components are applied via a righthand and a lefthand circular polarization path to respective branching circuits to be halved. One halved portion of each orthogonal component is supplied to a transfer circuit and the other halved portion thereof is supplied to a coupler.

Each transfer circuit is connected to that coupler supplied with the other halved portion of the other orthogonal component and adjusts the phase angle and amplitude of the halved portion of the associated orthogonal component so that both couplers produce the desired signals free from the influence of a cross polarization.

In the transmitter unit, a pair of linearly polarized orthogonal waves are supplied to respective branching circuits to be halved. One halved portion of each of the linearly polarized orthogonal waves is supplied to a transfer circuit equivalent to that included in the receiver unit and the other halved portion thereof is supplied to a coupler. The transfer circuits impart preliminarily to halved portions of the linearly polarized orthogonal waves a cross polarization sufficient to cancel the depolarization of propagation passageways observed at an associated receiving point when the antenna transmits an electromagnetic wave in the form of a pair of elliptically polarized waves oppositely rotated through components corresponding to those disposed in the receiver unit.

The cross polarization compensating system as described above has been disadvantageous in that a pair of transfer circuits are required to be disposed in each of the transmitter and receiver units, resulting in a complicated, large-sized circuit configuration. Therefore, the cited system has been expensive to be manufactured and decreased in reliability. Also, an improvement in cross polarization has been affected by the unbalanced characteristics of the amplitude and phase angle developed between the righthand and lefthand circular polarization paths in each of the transmitter and receiver units. Furthermore, the pair of transfer circuits have required control mechanisms for adjusting the cross polarization components necessary for the cancellation, resulting in the disadvantage that failures occur with a high probability.

Accordingly, it is an object of the present invention to provide a new and improved antenna feeding system requiring only a single transfer circuit in one of either a transmitter and a receiver unit.

It is another object of the present invention to provide a new and improved antenna feed system free from the influence of the unbalanced characteristics of the amplitude and phase angle upon a righthand and a lefthand circular polarization path. It is still another object of the present invention to decrease the number of control mechanisms forming the transfer circuits to reduce the probability of the occurrence of failures.

SUMMARY OF THE INVENTION

The present invention provides an antenna feed system for coupling a receiver to a receiving antenna for receiving a pair of elliptically polarized waves having the same frequency spectrum and rotated in opposite relationship with each other, which system comprises polarizer unit means for transforming one of the elliptically polarized waves included in a received output from the receiving antenna to a linearly polarized wave having a predetermined plane of polarization, an ortho-mode transducer connected to the polarizer subunit means at the output and including a pair of first and second outputs, the ortho-mode transducer delivering a first electromagnetic wave having the same plane of polarization as the linearly polarized wave to the first output and a second electromagnetic wave having a plane of polarization orthogonal to that of the linearly polarized wave to the second output, a transfer circuit coupled to the second output of the ortho-mode transducer to impart controllably an attenuation in amplitude and a phase lag to one portion of the second electromagnetic wave from the second output, and a coupler for combining the second electromagnetic wave from the transfer circuit with the first electromagnetic wave from the first output of the ortho-mode transducer.

The present invention also provides an antenna feed system for coupling a transmitter to a transmitting antenna for transmitting a pair of elliptically polarized waves having the same frequency spectrum and rotated in opposite relationship with each other, which system comprises a branching circuit having applied thereto one of two linearly polarized orthogonal waves and including a pair of first and second outputs, the branching circuit dividing the one of linearly polarized orthogonal wave into two portions to deliver the divided portions to the first and second outputs respectively, a transfer circuit connected to the first output of the branching circuit to change a phase angle and an amplitude of the divided portion of the linearly polarized wave delivered through the first output by predetermined magnitudes in order to prevent a deviation from the orthogonal relationship of the pair of elliptically polarized waves from occurring on the receiving side by compensating for the deviation on the transmitting side, a coupler connected to receive both an output from the transfer circuit and the other of the linearly polarized orthogonal waves to combine them with each other, an ortho-mode transducer connected to receive both an output from the coupler and the other divided portion of the linearly polarized wave delivered through the second output of the branching circuit to transform the one of the linearly polarized waves to an elliptically polarized wave, and deliver the other divided portion of the linearly polarized wave while the latter remains intact, polarizer unit means receiving an output from the ortho-mode transducer and transforming the other of the linearly polarized waves to an elliptically polarized wave, and a transmitting antenna for transmitting a pair of elliptically polarized waves delivered from the polarizer unit means.

Further, there may be provided an antenna feed system for coupling a transmitter and a receiver to a simultaneously transmitting and receiving antenna for transmitting and receiving a pair of elliptically polarized waves having the same frequency spectrum and rotated in opposite relationship with each other by coupling both polarizer unit means connected to the associated components as described above to the simultaneously transmitting and receiving antenna through a duplexer.

Preferably the transfer circuit may include a variable attenuator and a variable phase shifter serially connected to each other.

Advantageously, the transfer circuit may include a variable attenuator and a fixed phase shifter serially connected thereto to impart a predetermined fixed phase shift to the polarized wave applied thereto.

BRIEF DESCRIPTION OF THE DRAWINGS

The present invention will become more readily apparent from the following detailed description taken in conjunction with the accompanying drawings in which.

Throughout the Figures, like reference numerals designate the identical or corresponding components.

DESCRIPTION OF THE PREFERRED EMBODIMENTS

Figure 1:
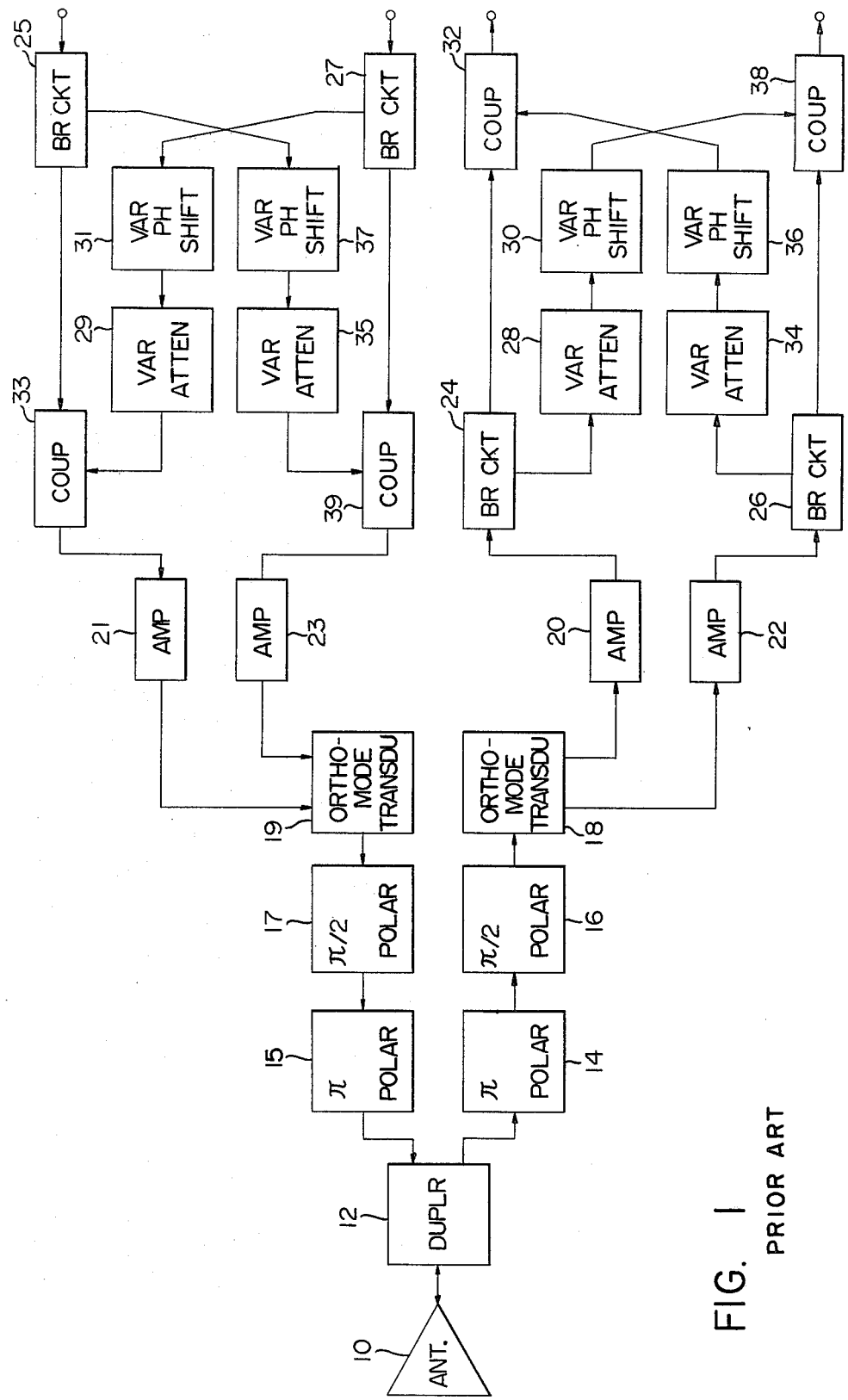
FIG. 1 is a block diagram of a conventional antenna feed system.

Referring now to FIG. 1 of the drawings, there is illustrated a conventional antenna feeding system disclosed in Japanese laid-open patent application No. 115,717/1976 entitled "Cross Polarization Compensating System". The arrangement illustrated comprises a simultaneously operated transmitting and receiving antenna 10 and a duplexer 12 including a port connecting the duplexer 12 to the antenna 10, a port connecting the dulplexer 12 to a transmitter unit and a port connecting the duplexer 12 to a receiver unit so as to separate the coupling of the antenna 10 to the receiver unit from the coupling of the antenna 10 to the transmitter unit. The receiver unit includes a $\pi$ polarizer 14 connected to the receiver connected port of the duplexer 12, a $\pi/2$ polarizer 16 connected to the $\pi$ polarizer 14 and an ortho-mode transducer 18 connected to the output of the $\pi/2$ polarizer 16. The ortho-mode transducer 18 includes a pair of first and second outputs connected to amplifiers 20 and 22, which are subsequently connected to branching circuits 24 and 26 respectively.

The branching circuit 24 includes one output connected to a variable attenuator 28 subsequently connected to a variable phase shifter 30 and the other output connected to a coupler 32. Similarly, the branching circuit 26 includes one output connected to a variable attenuator 34 subsequently connected to a variable phase shifter 36 and the other output connected to a coupler 38. The variable phase shifters 30 and 36 are connected to the couplers 38 and 32 respectively.

The branching circuit 24, the variable attenuator 28, the variable phase shifter 30 and the coupler 38 form an interference cancelling circuit for an output from the branching circuit 26. Similarly, the branching circuit 26, the variable attenuator 34, the variable phase shifter 36 and the coupler 32 form an interference cancelling circuit for an output from the branching circuit 24.

It is well known that a pair of orthogonally polarized waves are subjected to differential attenuations, differential phase shifts and different rotations of the plane of polarization during their passage through their propagation path. Therefore, an electromagnetic wave received by the antenna 10 is generally in the form of a pair of elliptically polarized waves rotated in opposite relationship with each other.

For a better understanding of the present invention, a plane of polarization of an electromagnetic wave will now be described in conjunction with FIG. 2 wherein there are typically illustrated different planes of polarization of the electromagnetic wave. An electromagnetic wave entering the antenna 10 may have planes of polarization shown at elliptically polarized waves $V_o$ and $H_o$ with reference to two orthogonal coordinate axes x and y in FIG. 2A. In FIG. 1, a polarizer unit formed of the polarizers 14 and 16 is arranged to be rotatable about the longitudinal axis of an associated waveguide along which an electromagnetic wave travels within the waveguide. Therefore, it is well known that, by rotating the polarization unit 14–16 about the longitudinal axis of the waveguide, the elliptically polarized waves $V_o$ and $H_o$ as shown in FIG. 2A can be transformed to elliptically polarized waves $V_1$ and $H_1$ as shown in FIG. 2B, wherein the waves are shown as having their major axes orthogonal to each other and lying on the x and y axes. Therefore, the electromagnetic wave at the input to the ortho-mode transducer 18 has its planes of polarization as illustrated in FIG. 2B.

Assuming that the elliptically polarized wave $V_1$ has an x and a y component expressed by $V_{1x}$ and $V_{1y}$ respectively and the elliptically polarized wave $H_1$ has an x and a y component expressed by $H_{1x}$ and $H_{1y}$ respectively, a voltage $E_y$ at the input to the amplifier 20 may be expressed by:

$$E_y = V_{1y} + H_{1y} \tag{1}$$

while a voltage $E_x$ at the input to the amplifier 22 may be expressed by:

$$E_x = V_{1x} + H_{1x}. \tag{2}$$

It is noted that the amplifier has its gain characteristic degree normalized to unity only for purposes of simplification. This normalization is also applied to the other amplifiers in the following descriptions.

Each of the branching circuits 24 or 26 halves an input applied thereto, in this case, the voltage $E_y$ or $E_x$ respectively. The branching circuit 24 delivers one half of the voltage $E_y$ to the variable attenuator 28 through the first output and the other half thereof to the coupler 32 through the other output. Similarly, the branching circuit 26 delivers one half of the voltage $E_x$ to the variable attenuator 34 through the one output and the other half thereof to the 38 through the other output.

It is assumed that a transfer circuit formed of the variable attenuator 34 and the variable phase shifter 36 has a transfer function $\alpha_1$ and that another transfer circuit formed of the variable attenuator 28 and the variable phase shifter 30 has a transfer function $\alpha_2$. Under the assumed conditions, the coupler 32 provides an output $S_y$ expressed by:

$$S_y = \tfrac{1}{2}[V_{1y} + H_{1y} - \alpha_1(V_{1x} + H_{1x})] \qquad (3)$$

while the coupler 38 provides an output $S_x$ expressed by:

$$S_x = \tfrac{1}{2}[H_{1x} + V_{1x} - \alpha_2(H_{1y} + V_{1y})] \qquad (4)$$

Figures 2A, 2B, 2C:
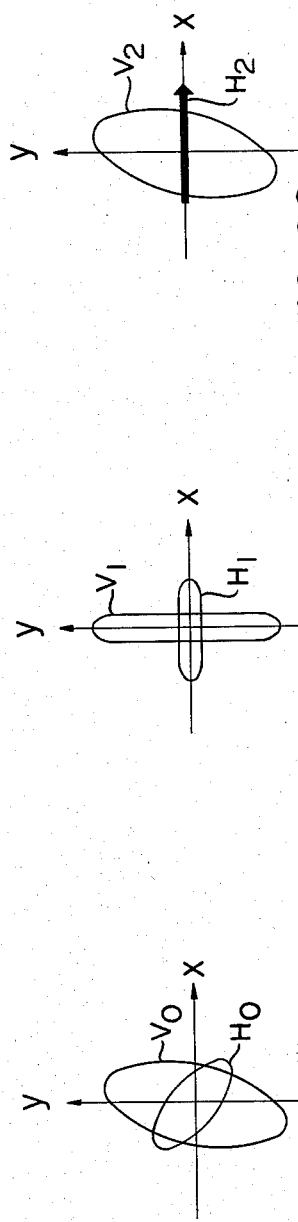
FIGS. 2A, 2B and 2C are diagrams illustrating typically different planes of polarization of electromagnetic waves.

As seen in FIG. 2B, $V_{1y} > V_{1x}$ and $H_{1x} > H_{1y}$. Therefore, the adjustment of the transfer functions $\alpha_1$ and $\alpha_2$ can result in:

$$H_{1y} = \alpha_1 H_{1x} \qquad (5)$$

and $$V_{1x} = \alpha_2 V_{1y} \qquad (6)$$

By substituting the expression (5) in the expression (3), the output $S_y$ from the coupler 32 can include no component due to the elliptically polarized wave $H_1$. Similarly, by substituting the expression (6) in the expression (4), the output $S_x$ from the coupler 38 can include no component due to the elliptically polarized wave $V_1$. This means that the desired signal can be detected with the influence of the cross polarization removed.

On the other hand, the transmitter unit connected to the duplexer include a circuitry having the same circuit configuration as described above in the receiver unit excepting that the branching circuits exchange in position the couplers and that the components of the circuitry are interconnected so as to pass signals therethrough in a direction opposite to that described above. Each component of the transmitter unit side is designated by an odd reference numeral which is greater by one than the even reference numeral denoting the corresponding component of the receiver unit. For example, the odd reference numeral 25 designates one of the branching circuit disposed in the transmitter unit and corresponding to the branching circuit 24 disposed in the receiver unit.

In the transmitter unit, a carrier wave for a first signal is applied to the branching circuit 25 while a carrier wave for a second signal is applied to the branching circuit 27. Those carrier waves are transmitted from the antenna 10 after they have been preliminarily given a cross polarization sufficient to cancel the depolarization of propagation passageways observed at an associated receiving point when the carrier waves in the form of a pair of elliptically polarized waves are transmitted.

Reference to the details of the arrangement shown in FIG. 1 may be made to Japanese laid-open Patent application No. 115,717/1976 but it is apparent that it requires a pair of transfer circuits formed of the variable attenuators and phase shifters 29, 31 and 35, 37 or 28, 30 and 34, 36 respectively in each of the transmitter and receiver units. This has resulted in the disadvantages that the circuit configuration is complicated and large-sized and therefore expensive to manufacture and having decreased reliability. Also, the arrangement of FIG. 1 has been disadvantageous in that improvements in cross polarization is affected by the unbalanced characteristics of the amplitude and phase between a righthand and a lefthand circular polarization path including the amplifiers 20 and 22 or 21 and 23. In addition, the pair of transfer circuits 28, 30 and 34, 36 or 29, 31 and 35, 37 in each of the receiver and transmitter units have required respective control mechanisms in order to adjust the cross polarization components to be necessary for the cancellation. This has resulted in the disadvantage in that failures occur with a high probability.

The present invention contemplates to eliminate the disadvantages of the prior art practice as described above by the provision of a circuit configuration simplified by disposing a single transfer circuit in each of the transmitter and receiver units and free from influences of the unbalanced characteristics of the amplitude and phase angle upon the righthand and lefthand circular polarization paths by locating amplifiers in front of a transfer circuit and couplers in transmitter unit.

Figure 3:
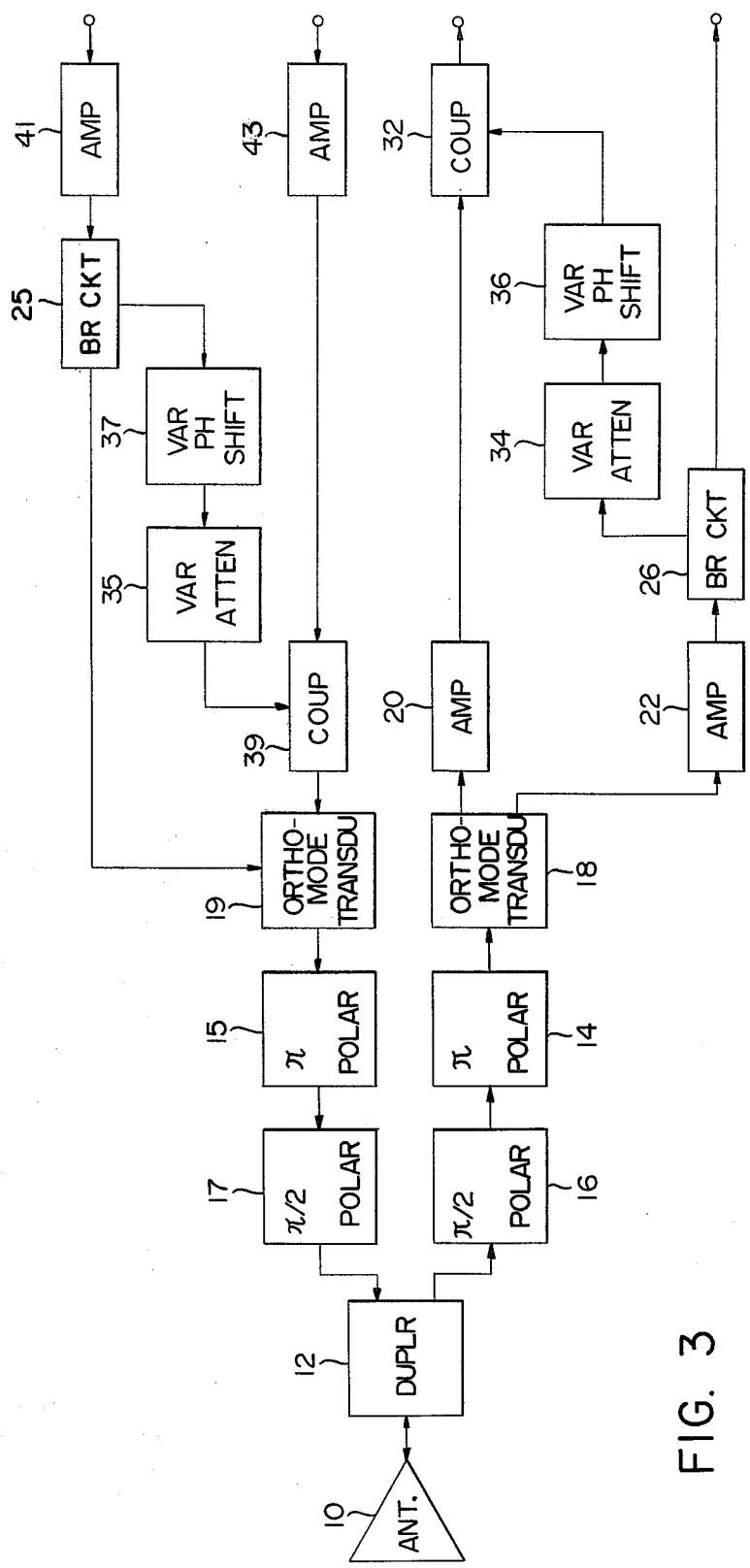
FIG. 3 is a block diagram of one embodiment according to the antenna feed system of the present invention.

Referring now to FIG. 3, there is illustrated one embodiment according to the antenna feed system of the present invention. In the arrangement illustrated, a pair of transmitting amplifiers 41 and 43, corresponding to the amplifiers 21 and 23 respectively, are connected to the branching circuit 25 and the coupler 39 respectively while omitting one of the transfer circuits, that is, the branching circuit 27, the variable phase shifter 31 and the variable attenuator 29 in the transmitter unit and also one of the transfer circuits, in this case, the series combination of the variable phase shifter 30 and the variable attenuator 28 along with the coupler 38 in the receiver unit. In other words, the transmitting amplifiers 41 and 43 are located in front of the branching circuit 25 and coupler 39, the variable attenuator 35 and the variable phase shifter 37 but not between the orthomode transducer 19 and the branching circuit 25 and coupler 39. Therefore, the unbalanced characteristics of the amplitude and phase angle offer no problem with respect to the righthand and lefthand circular polarization paths.

As in the arrangement of FIG. 1, an electromagnetic wave received by the antenna 10 is supplied to the $\pi/2$ polarizer 16 through the duplexer 12 and the port thereof connected to the receiver unit. The electromagnetic wave entering the $\pi/2$ polarizer 16 includes a pair of elliptically polarized waves having, for example, respective planes of polarization as shown in FIG. 2A. In the arrangement of FIG. 3, however, by adjusting polarizer unit means composed of the $\pi$ polarizer 14 and the $\pi/2$ polarizer 16 cascade-connected to each other, one of the elliptically polarized waves is transformed to a linearly polarized wave having its plane of polarization aligned with the x axis and perpendicular to the y axis as shown by the arrow $H_2$ in FIG. 2C, wherein the reference character $V_2$ designates a plane of polarization of the other elliptically polarized wave. It can be understood that this transformation of the polarized wave is possible because the rotation of the $\pi/2$ polarizer 16 enables the input linearly polarized wave to an arbitrary polarized wave output and the rotation of the $\pi$ polarizer 14 permits the rotation of a plane of polarization of a linearly polarized wave.

As a result, $$E_y = V_{2y} \qquad (7)$$

and:

$$E_x = H_2 + V_{2x} \qquad (8)$$

with respect to FIG. 2C. The expressions (7) and (8) correspond respectively to expressions (1) and (2) as described above in conjunction with FIGS. 1 and 2B.

The ortho-mode transducer 18 receives polarized waves from the $\pi$ polarizer 14 and delivers an electromagnetic wave having the same plane of polarization as the linearly polarized wave transformed by $\pi/2$ and $\pi$ polarizers 16 and 14 to the first output thereof and an electromagnetic wave having a plane of polarization orthogonal to that of the linearly polarized wave to the second output thereof.

Therefore, the electromagnetic wave developed at the first output of the ortho-mode transducer 18 may be expressed by the expression (7) and is amplified by the amplifier 22. Then the branching circuit 26 provides at one of its outputs a carrier wave $S_y$ expressed by:

$$S_y = \tfrac{1}{2} E_y = \tfrac{1}{2} V_{2y}. \qquad (9)$$

Thus, the carrier wave $S_y$ includes no component due to the polarized wave $H_2$.

On the other hand, the electromagnetic wave developed at the second output of the ortho-mode transducer 18 may be expressed by the expression (8) and is supplied to the coupler 32 after having amplified by the amplifier 20.

The other output of the branching circuit 26 supplies an output expressed by $\tfrac{1}{2} E_{2y} = \tfrac{1}{2} V_{2y}$ to the transfer circuit 34-36 which has a transfer function $\alpha_3$ and supplies an output $\alpha_3 V_{2y}$ to the coupler 32.

The coupler 32 combines the output $\alpha_3 V_{2y}$ from the transfer circuit 34-36 with the output from the amplifier 20 (which is expressed by the expression (8)) to provide an output $S_x$ expressed by:

$$S_x = E_x - \alpha_3 V_{2y} = H_2 + V_{2x} - \alpha_3 V_{2y} \qquad (10)$$

By adjusting the transfer function $\alpha_3$ such that:

$$\alpha_3 V_{2y} = V_{2x} \qquad (11),$$

the expression (10) is reduced to the following expression;

$$S_x = H_2. \qquad (12).$$

That is, the coupler 32 provides a carrier wave having no component due to the polarized wave $V_2$.

From the foregoing it is seen that, in the receiving side, one of a pair of elliptically polarized waves rotated in opposite relationship with each other is restored to a linearly polarized wave aligned with a predetermined polarization direction by the polarizer unit. Therefore, the restored wave has no cross polarization component.

The other one of the pair of waves which is, in general, elliptically polarized and its major axis is orthogonal to the linearly polarized wave at the output of the ortho-mode transducer, is derived by the ortho-mode transducer and then the cross polarization component is cancelled by the interference cancellation circuit disposed in the rear of the ortho-mode transducer.

Therefore, the present invention is required only to employ the single transfer circuit 34-36 on the receiving side, whereas conventional system such as shown in FIG. 1 have been required to employ a pair of cross-connected transfer circuit such as shown by the reference numerals 28-30 and 34-36. Accordingly, the resulting circuit configuration and the adjustment thereof is simplified.

Furthermore, it is noted that the amplifier 22 shown in FIG. 3 amplifies only the $V_2$ component as shown by the expression (7) with the result that the unbalance of the phase and amplitude characteristics between the righthand and lefthand circular polarizations in the $V_2$ paths as in the amplifier 22 shown in FIG. 1 is not required to be called in question.

Like the receiver unit, the transmitter unit is required only to employ the single transfer circuit 35-37.

In the arrangement of FIG. 3, the operation of the transmitter unit can readily be understood from that performed in the arrangement of FIG. 1 and need not be described in detail.

In the transmitter unit, a pair of linearly polarized orthogonal waves wave are applied to the branching circuit 25 and the coupler 39 through the amplifiers 41 and 43 respectively. The branching circuit 25 halves the linearly polarized wave applied thereto and includes a pair of first and second outputs from which the halved portions of the linearly polarized wave are taken out respectively. The first output of the branching circuit 25 is connected to the transfer circuit formed of the variable phase shifter 37 and the variable attenuator 35 serially connected to each other. In order to prevent a signal in the form of two elliptically polarized waves transmitted from the antenna 10 and received by at an associated receiving point from deviating from the orthogonal relationship, the transfer circuit 37-35 is operative to compensate for such a deviation on the transmitting side by varying the amplitude and phase of the linearly polarized wave portion from the first output of the branching circuit 25 by predetermined magnitudes. Then, the linearly polarized wave portion from the transfer circuit 37-35 is applied to the coupler 39 where it is combined with the other of the linearly polarized orthogonal wave from the amplifier 43.

Then, the ortho-mode transducer 19 receives outputs from both the branching circuit 25 and the coupler 39 and transforms the one of the linearly polarized waves to an elliptically polarized wave and delivers the other divided portion of the linearly polarized wave while the latter remains intact. A polarizer unit means composed of the serially connected $\pi$ and $\pi/2$ polarizers 17 and 15 respectively is connected to the ortho-mode transducer 19 to transform the other linearly polarized wave from the latter to an elliptically polarized wave and applies both elliptically polarized waves to the antenna 10 though the duplexer 12. Thus, the antenna 10 transmits the two elliptically polarized waves toward the associated receiving point (not shown).

The present invention is used principally in the field of microwaves and therefore is, in many cases, composed of waveguide circuitry.

Figure 4:
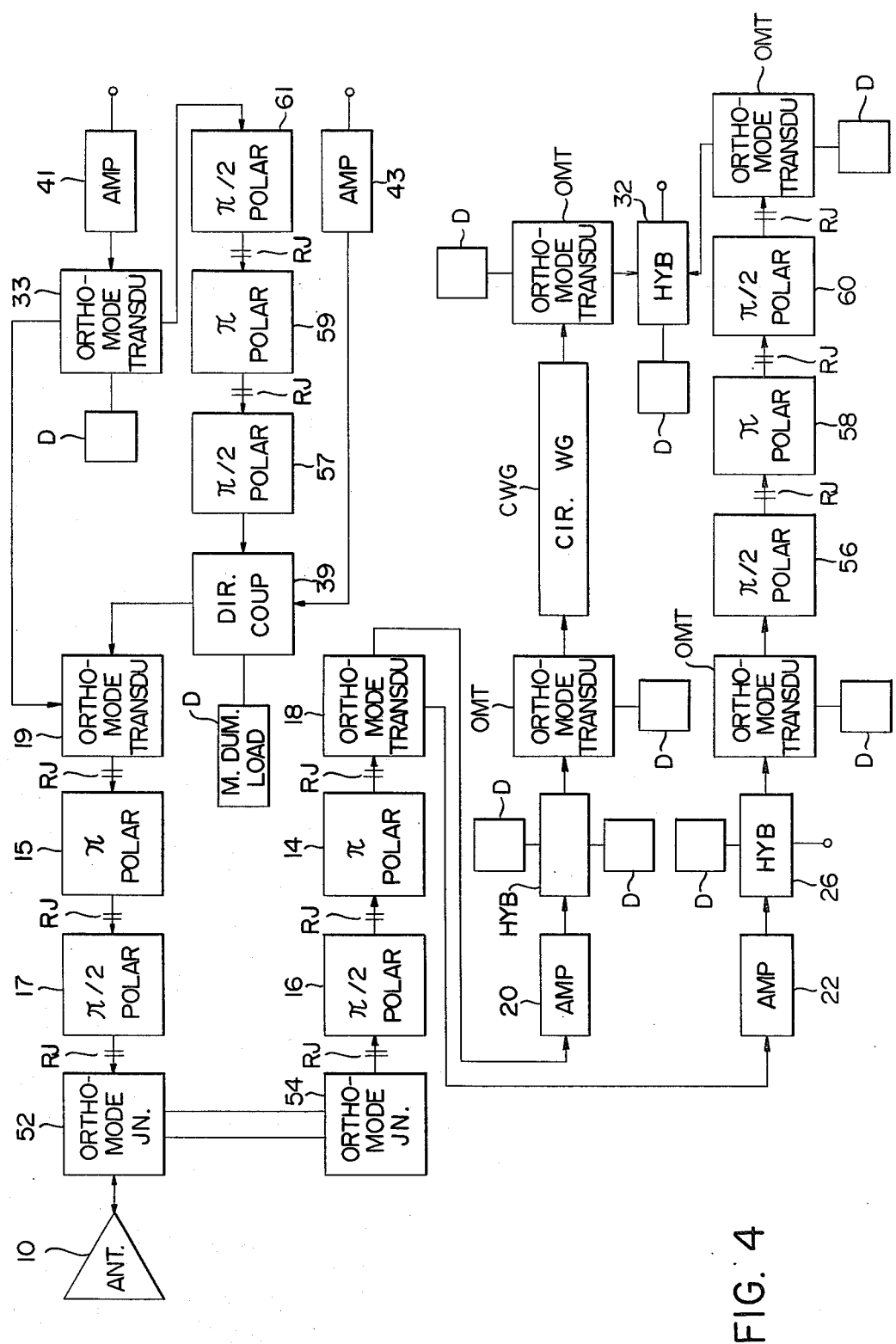
FIG. 4 is a block diagram illustrating, by way of example, one circuit configuration of the arrangement as shown in FIG. 3 used with microwaves.

FIG. 4 shows a modification of the arrangement as shown in FIG. 3, the modified arrangement being composed of waveguide circuits. In the arrangement illustrated, the duplexer 12 shown in FIG. 3 is formed of an orthomode junction 52 and another orthomode junction 54 (which are also designated OMJ) serially interconnected in a two way manner and in the named order. The ortho-mode junctions 52 and 54 are connected to the $\pi/2$ polarizers 17 and 16 through rotating joints RJ respectively. The rotating joint RJ connects rotatably a section of a circular waveguide to an adjacent section thereof. Then, each of the $\pi/2$ polarizers 17 or 16 is connected via a rotating joint RJ to the associated $\pi$ phase difference 15 or 14 which in turn is subsequently connected to its mating orthomode transducer 19 or 18 (which is also designated OMT) through a rotating joint RJ.

The amplifier 20 is connected to the coupler 32 formed of a hybrid circuit HYB with a matched dummy load D through a series combination of a hybrid circuit HYB with a pair of matched dummy loads, an orthomode transducer OMT with matched dummy load D, a section of a circular waveguide CWG and an orthomode transducer OMT with a matched dummy load D.

The branching circuit 26 is formed of a hybrid circuit HYB with a matched dummy load D and connected to the coupler 32 through a series combination of an orthomode transducer OMT with a matched dummy load D, a $\pi/2$ polarizer 56, a $\pi$ polarizer 58, a $\pi/2$ polarizer 60 and an orthomode transducer OMT with a matched dummy load D. Each of the polarizers is connected to the next succeeding one through a rotating joint RJ and the $\pi/2$ polarizer 60 is also connected to an ortho-mode transducer OMT through a rotating joint RJ. The polarizers 56, 58 and 60 form the transfer circuit composed of elements 34-36 in FIG. 3.

The branching circuit 25 is formed of an orthomode transducer 33 with a matched dummy load D and connected to the coupler 39 formed of a directional couplers DC with matched dummy load D through a series combination of a $\pi/2$ polarizer 61, a $\pi$ polarizer 59 and a $\pi/2$ polarizers 57 interconnected in the same manner as the phase difference plates 60, 58 and 56. This series combination of the polarizers 61, 59 and 57 form the transfer circuit composed of elements 37-35 in FIG. 3.

Figure 5:
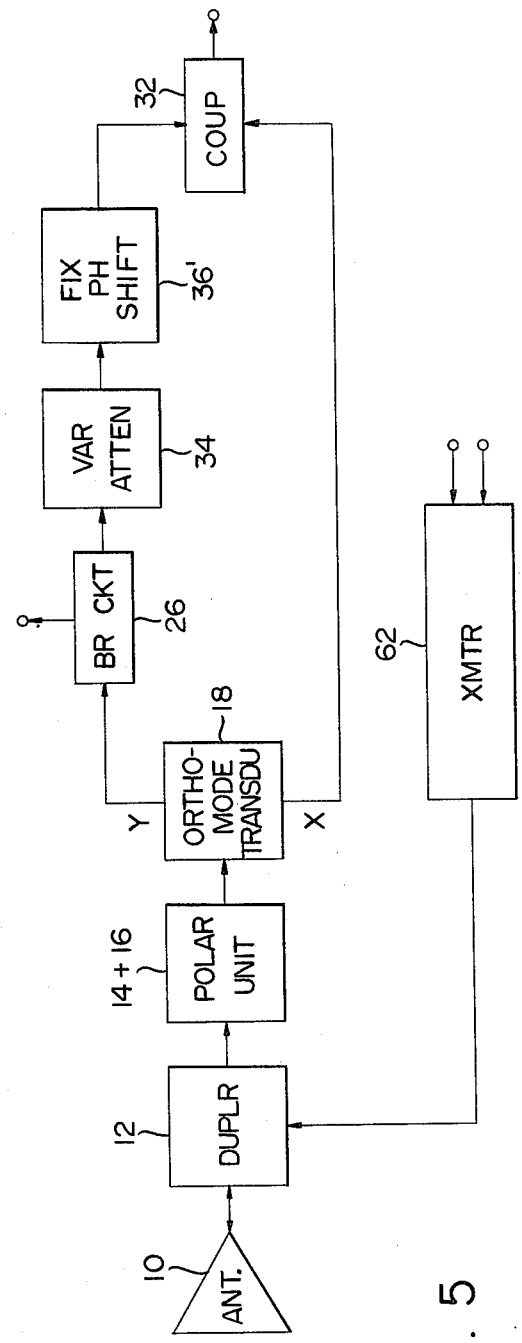
FIG. 5 is a block diagram of a modification of the present invention.

FIG. 5 shows a modification of the present invention contemplating to decrease the number of control mechanisms involved. The arrangement illustrated is different from that shown in FIG. 3 only in that in FIG. 5 a fixed phase shifter 36' is substituted for the variable phase shifter 36 with all the components of the transmitter unit schematically designated by a single box 62. Also the $\pi/2$ and $\pi$ polarizers 14 and 16 are designated a single box labelled 14 +16 and forms a polarizer unit for transforming a polarized wave.

By setting the $\pi/2$ polarizer 16 to the major axis of one of incoming elliptically polarized waves H, the latter associated wave is transformed to a linearly polarized wave. When the $\pi$ polarizer 14 is rotated to one half an angle formed between the plane of polarization of the linearly polarized wave thus transformed and an x output or the second output of the ortho-mode transducer 18, the polarized wave H forms a linearly polarized wave coinciding to the x output as will readily be understood from the illustration of FIGS. 2A, 2B and 2C.

At that time, the other of the incoming elliptically polarized waves, V, subjected to both a differential phase difference and a differential attenuation due to a rainfall or rainfalls, is transformed to an elliptically polarized wave which is, in turn, coupled to the x and y outputs of the ortho-mode transducer 18. The elliptically polarized wave V, coupled to the x and y outputs, has a phase difference $\theta$ expressed by:

$$\theta = (\pi/2) - \tan^{-1}\{\tanh(0.11513\Delta L)/\tan\Delta\phi\} \tag{13}$$

where $\Delta\phi$ designates a differential phase shift and $\Delta L$ designates a differential attenuation in dB. In the 4 and 6 GHz bands used in the satellite communication, the phase difference $\theta$ is substantially of $\pi/2$ radians because the differential attenuation $\Delta L$ is smaller than the differential phase shift $\Delta\phi$. Also, the change in rainfall intensity causes differential attenuation and phase shift to vary proportionally, thus resulting in a small change in phase difference $\theta$.

Therefore, by fixing the phase shifter 36' to obtain the desired phase shift, an associated control mechanism can be omitted without the performance degradation of the interference cancellation circuit. This results in a cross polarization compensation system which is simple in circuit configuration and small in its probability of occurrence of failures.

In the arrangement of FIG. 5, the coupler 32 may be of a variable type with the variable attenuator 34 omitted.

Also, the arrangement of FIG. 5 has been described in conjunction with the receiver unit, but it will readily be understood that the foregoing is equally applicable to the transmitter unit 62.

From the foregoing it is seen that the present invention provide an antenna feed system capable of compensating for a cross polarization with both a simple circuit configuration and a high reliability.

While the present invention has been illustrated and described in conjunction with a few preferred embodiments thereof, it is to be understood that numerous changes and modifications may be resorted to without departing from the spirit and scope of the present invention. For example, the present invention has been described in conjunction with combined transmitting and receiving systems but it is to be understood that the same is equally applicable to a system having either one of the transmitter and receiver units with its duplexer omitted.

We claim:

1. An antenna feed system for coupling a receiver unit to a receiving antenna for receiving a pair of elliptically polarized waves having the same frequency spectrum and rotated in opposite relationship with each other; which system comprises polarizer unit means for transforming one of said elliptically polarized waves included in a received output from said receiving antenna to a linearly polarized wave having a predetermined plane of polarization, an ortho-mode transducer connected to said polarizer unit means at its output and including a pair of first and second outputs, said ortho-mode transducer delivering a first electromagnetic wave having the same plane of polarization as said linearly polarized wave to said first output thereof and a second electromagnetic wave having a plane of polarization orthogonal to that of said linearly polarized wave to said second output thereof, a transfer circuit electrically connected to said second output of said ortho-mode transducer to impart controllably an attenuation and a phase lag to one portion of said second electromagnetic wave, and a coupler for combining said modified portion of said second electromagnetic wave from said transfer circuit with said first electromagnetic wave from said first output of said ortho-mode transducer, whereby a pair of received outputs are provided from said second output of said ortho-mode transducer and from said coupler respectively.

2. An antenna feeding system for coupling a transmitter unit to a transmitting antenna for transmitting a pair of elliptically polarized waves having the same frequency spectrum and rotated in opposite relationship with each other, which systems comprises a branching circuit having applied thereto one of a pair of linearly polarized orthogonal waves and including a pair of first and second outputs, said branching circuit dividing said one of said linearly polarized orthogonal wave into two portions to deliver said two divided portions to said first and second outputs respectively, a transfer circuit connected to said first output of said branching circuit to change a phase lag and an amplitude of the divided portion of said one of said linearly polarized orthogonal waves delivered through the first output by predetermined magnitudes in order to prevent a deviation from the orthogonal relationship of said pair of elliptically polarized waves occurring on the receiving side by compensating for said deviation on the transmitting side, a coupler connected to receive both an output from said transfer circuit and the other of said linearly polarized orthogonal waves to combine the two with each other, an ortho-mode transducer connected to receive both an output from said coupler and the other divided portion of said linearly polarized wave delivered through said second output of said branching circuit to transform said one of said linearly polarized orthogonal waves to an elliptically polarized wave and deliver said other divided portion of said linearly polarized wave while the latter remains intact, polarizer unit means connected to receive an output from said ortho-mode transducer and to transform the other of said linearly polarized orthogonal waves to an elliptically polarized wave, and a transmitting antenna for transmitting a pair of said elliptically polarized waves delivered from said polarizer unit means.

3. An antenna feed system for coupling a trasmitter and a receiver unit to a simultaneously transmitting and receiving antenna for transmitting and receiving a pair of elliptically polarized waves having the same frequency spectrum and rotated in opposite relationship with each other, which system comprises a duplexer, including an antenna connected end, a receiver connected end, and a transmitter connected end, to separate electrically the coupling of said antenna to said receiver unit from the coupling of said antenna to said transmitter unit, receiver polarizer unit means connected to receive an output from said receiver connected end of said duplexer to transform one of said pair of elliptically polarized waves included in said received output and rotated in opposite relationship with each other to a linearly polarized wave having a predetermined plane of polarization, a receiver ortho-mode transducer connected to said receiver polarizer unit means at its output and including a pair of first and second outputs, said receiver ortho-mode transducer delivering a first electromagnetic wave having the same plane of polarization as said linearly polarized wave to said first output thereof and a second electromagnetic wave having a plane of polarization orthogonal to that of said linearly polarized wave to said second output thereof, a receiver transfer circuit electrically connected to said second output of said receiver ortho-mode transducer to impart controllably an attenuation and a phase lag to one portion of said second electromagnetic wave, a receiver coupler for combining said modified portion of said second electromagnetic wave from said receiver transfer circuit with said first electromagnetic wave from said first output of said receiver ortho-mode transducer, whereby a pair of received outputs are provided from said second output of said ortho-mode transducer and from said receiver coupler respectively; a transmitter transfer circuit equivalent in circuit configuration to said receiver transfer circuit, a branching circuit for applying one portion of a carrier wave for a first signal to said transmitter transfer circuit, a transmitter coupler for combining an output from said branching circuit with a carrier wave for a second signal identical in frequency to said carrier wave for the first signal, a transmitter ortho-mode transducer equivalent in circuit configuration to said receiver ortho-mode transducer and including a pair of first and second inputs exchanging in position the pair of first and second outputs of the latter and an output exchanging in position the input of the latter, said first input being connected to said carrier wave for the first signal, said second input second input being connected to an output from said transmitter coupler, and transmitter polarizer unit means equivalent in structure to said receiver polarizer unit means and connected between said transmitter ortho-mode transducer and said transmitter unit connected end of said duplexer.

4. An antenna feed systems as claimed in any of claims 1, 2 and 3, wherein said polarizer unit means includes a $\pi/2$ polarizer and a $\pi$ polarizer cascade-connected to each other, said $\pi/2$ polarizer for changing a phase angle of one of a pair of elliptically polarized orthogonal waves rotated in opposite relationship with each other relative to that of the other thereof through $\pi/2$ radians, said $\pi$ polarizer for changing a phase angle of one of said elliptically polarized orthogonal waves relative to that of the other thereof through $\pi$ radians, and wherein said $\pi/2$ and $\pi$ polarizers are rotatable about an axis lying in a direction of travel of an electromagnetic wave including said elliptically polarized orthogonal waves.

5. An antenna feeding system as claimed in any one of claims 1, 2 and 3, wherein said transfer circuit includes a variable attenuator and a variable phase shifter serially connected to each other.

6. An antenna feed system as claimed in either one of claims 2 and 3, wherein a transmitting amplifier is connected in said transmitter unit in front of said transfer circuit.

7. An antenna feeding systems as claimed in any one of claims 1, 2 and 3, wherein said transfer circuit includes a variable attenuator and a fixed phase shifter serially connected to each other, said fixed phase shifter imparting a predetermined phase shift to an associated output applied thereto.

8. An antenna feed system for coupling a receiver unit to a receiving antenna for receiving a pair of elliptically polarized waves having the same frequency spectrum and rotated in opposite relationship with each other, said system comprising:
   a polarizer means for transforming one of said elliptically polarized waves included in a received output from said receiving antenna to a linearly polarized wave having a predetermined plane of polarization;

an ortho-mode transducer connected to said polarizer means and having a first output for providing a first electromagnetic wave having the same plane of polariztion as said linearly polarized wave and a second output for providing a second electromagnetic wave having a plane of polarization orthogonal to that of said linearly polarized wave;

a bridge circuit connected to said second output of said ortho-mode transducer for dividing said second output of said ortho-mode transducer into first and second portions;

a tranfer circuit connected to said first output of said bridge circuit for providing a signal corresponding to a controllably attenuated and phase shifted version of said second output of said ortho-mode transducer;

a coupler operatively connected to said first output of said ortho-mode transducer and said tranfer circuit for combining same;

whereby a pair of received outputs are provided from said second output of said bridge circuit and from said coupler respectively.

* * * * *